US010479188B2

(12) United States Patent
Fremau et al.

(10) Patent No.: US 10,479,188 B2
(45) Date of Patent: Nov. 19, 2019

(54) HYBRID TRANSMISSION WITH OFFSET ELECTRIC MACHINE AND METHOD FOR CONTROLLING GEAR CHANGES

(71) Applicants: RENAULT s.a.s., Boulogne-Billancourt (FR); NISSAN MOTOR Co., Ltd., Yokohama-shi (JP)

(72) Inventors: Nicolas Fremau, Saint Remy les Chevreuse (FR); Arnard Villeneuve, Vernouillet (FR); Ahmed Ketfi-Cherif, Elancourt (FR); Antoine Vignon, Igny (FR)

(73) Assignees: RENAULT s.a.s., Boulogne-Billancourt (FR); NISSAN MOTOR Co., Ltd., Yokohama-shi (JP)

( * ) Notice: Subject to any disclaimer, the term of this patent is extended or adjusted under 35 U.S.C. 154(b) by 359 days.

(21) Appl. No.: 15/320,909

(22) PCT Filed: May 21, 2015

(86) PCT No.: PCT/FR2015/051347
§ 371 (c)(1),
(2) Date: Dec. 21, 2016

(87) PCT Pub. No.: WO2015/197927
PCT Pub. Date: Dec. 30, 2015

(65) Prior Publication Data
US 2017/0129323 A1 May 11, 2017

(30) Foreign Application Priority Data

Jun. 24, 2014 (FR) ...................................... 14 55850

(51) Int. Cl.
*F16H 37/08* (2006.01)
*B60K 6/48* (2007.10)
(Continued)

(52) U.S. Cl.
CPC ................ *B60K 6/547* (2013.01); *B60K 6/36* (2013.01); *B60K 6/442* (2013.01); *B60K 6/48* (2013.01);
(Continued)

(58) Field of Classification Search
CPC ........ F16H 37/0806; B60K 2006/4816; B60K 2006/4825
(Continued)

(56) References Cited

U.S. PATENT DOCUMENTS 6,251,042 B1 * 6/2001 Peterson .................. B60K 6/48
477/3
9,789,754 B2 * 10/2017 Zhu ...................... F16H 37/0806
(Continued)

FOREIGN PATENT DOCUMENTS

DE   10 2011 077 594 A1   12/2012
DE   10 2011 089 710 A1    6/2013
(Continued)

OTHER PUBLICATIONS

French Search Report dated Feb. 19, 2015 in French Patent Application FR 1455850 filed Jun. 24, 2014.
(Continued)

*Primary Examiner* — Ha Dinh Ho
(74) *Attorney, Agent, or Firm* — Oblon, McClelland, Maier & Neustadt, L.L.P.

(57) ABSTRACT

A hybrid transmission is for a motor vehicle provided with a heat engine and a main drive electric machine. The transmission includes two concentric input shafts connected to a crankshaft of the heat engine and to the electric machine with no disconnect clutch, an output shaft connected to wheels of the vehicle by a differential, and a shaft for transferring movement from an input shaft to the output shaft and for coupling the input shafts. The electric machine (Continued)

is arranged at the end opposite the input shafts relative to the heat engine.

22 Claims, 10 Drawing Sheets

(51) Int. Cl.
    *B60K 6/547*     (2007.10)
    *B60K 6/442*     (2007.10)
    *F16H 3/091*     (2006.01)
    *B60K 6/36*     (2007.10)

(52) U.S. Cl.
    CPC ......... *F16H 3/091* (2013.01); *F16H 37/0806* (2013.01); *B60K 2006/4816* (2013.01); *B60K 2006/4825* (2013.01); *B60Y 2200/92* (2013.01); *F16H 2200/0039* (2013.01); *Y02T 10/6221* (2013.01); *Y02T 10/6234* (2013.01); *Y02T 10/6256* (2013.01); *Y10S 903/909* (2013.01); *Y10S 903/919* (2013.01)

(58) Field of Classification Search
    USPC .......................................................... 74/661
    See application file for complete search history.

(56) References Cited

U.S. PATENT DOCUMENTS

| | | | |
|---|---|---|---|
| 10,144,309 B2 * | 12/2018 | Leng | B60L 11/18 |
| 2011/0239820 A1 * | 10/2011 | Shibahata | B60K 6/48 |
| | | | 74/665 L |
| 2014/0315681 A1 | 10/2014 | Fremau et al. | |

FOREIGN PATENT DOCUMENTS

| | | |
|---|---|---|
| EP | 2 368 739 A1 | 9/2011 |
| FR | 1 339 113 | 10/1963 |
| WO | 2013/060955 A1 | 5/2013 |

OTHER PUBLICATIONS

International Search Report dated Aug. 13, 2015 in PCT/FR2015/051347 filed May 21, 2015.

* cited by examiner

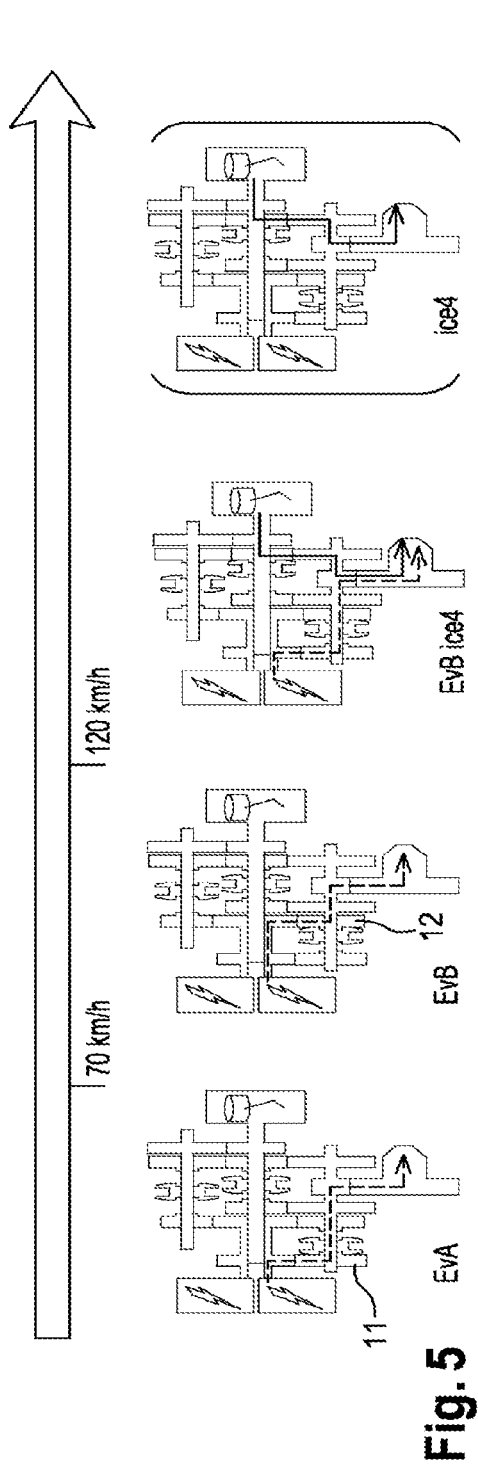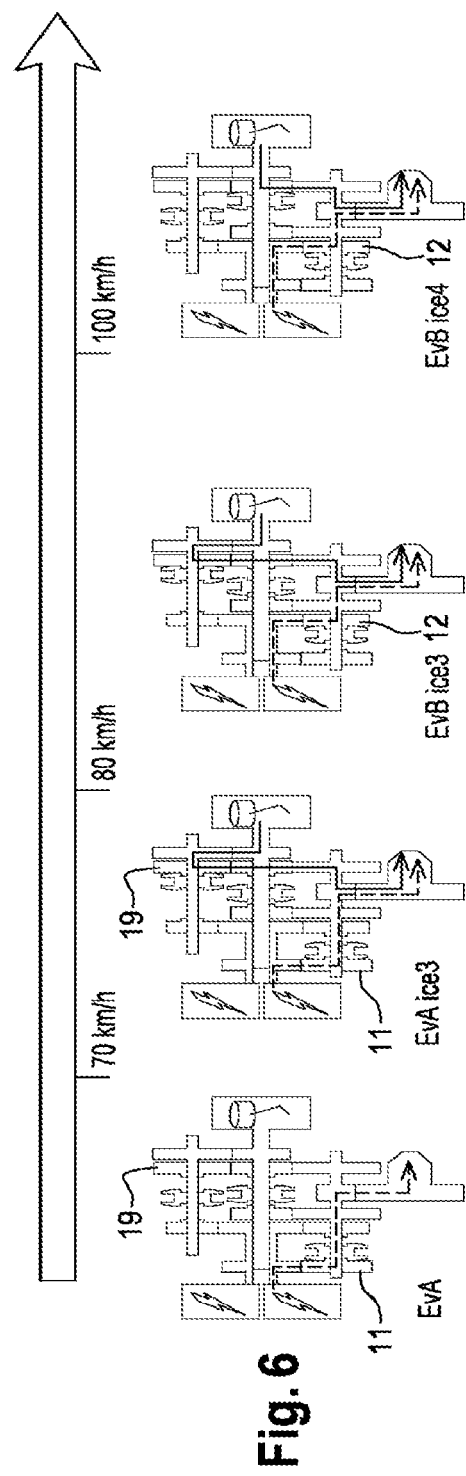

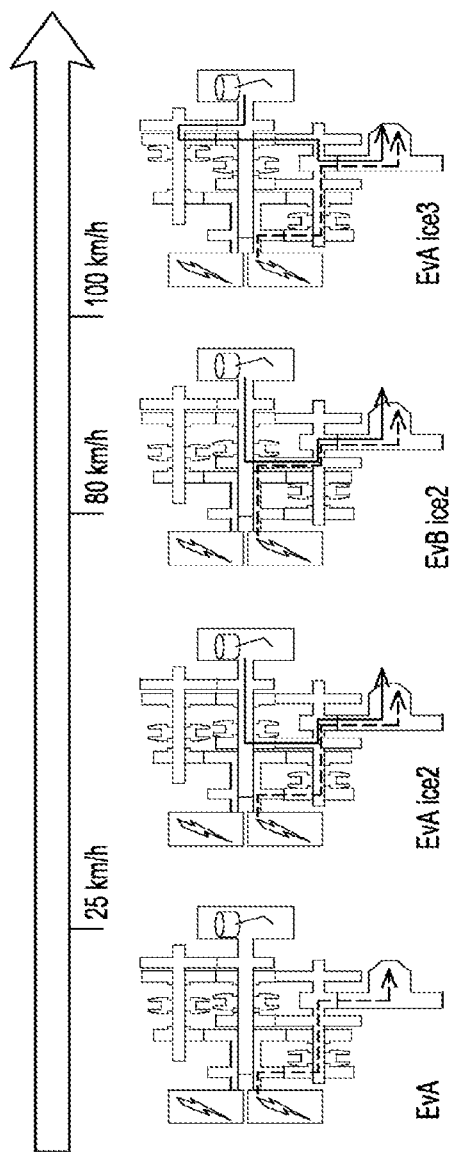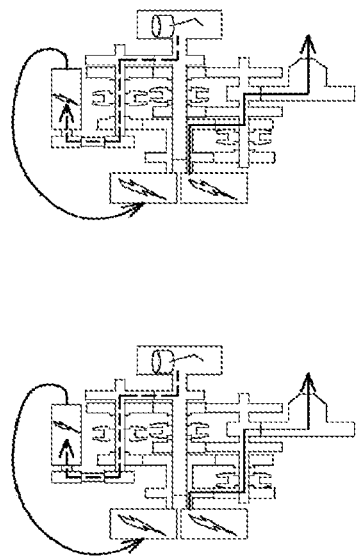
Fig. 7
Fig. 8A   Fig. 8B

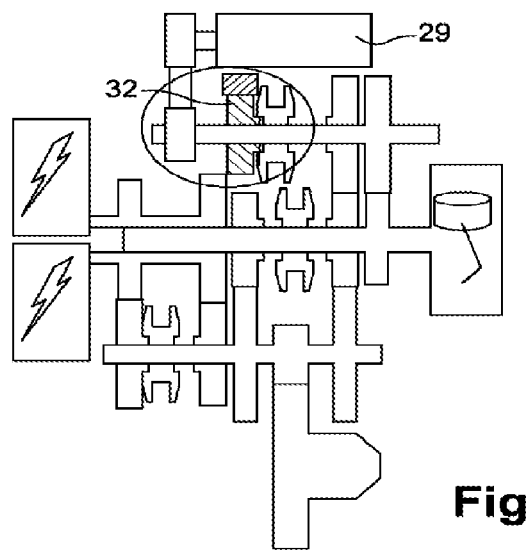
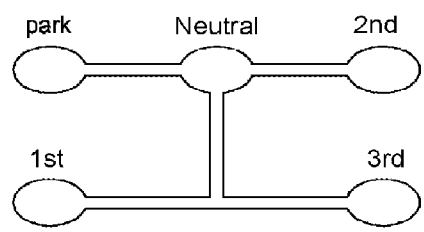
Fig. 12
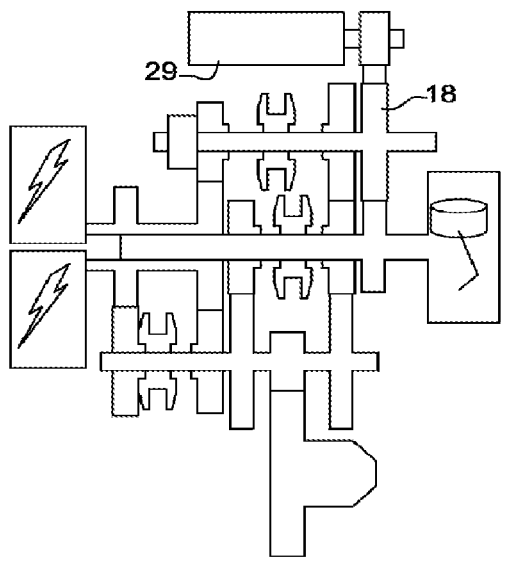
Fig. 13
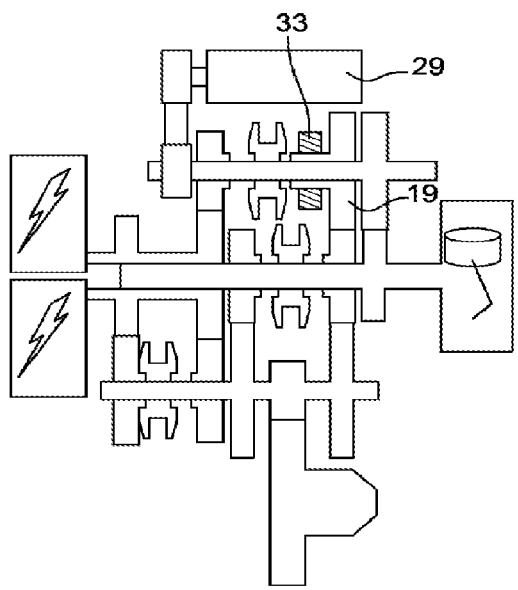
Fig. 14

HYBRID TRANSMISSION WITH OFFSET ELECTRIC MACHINE AND METHOD FOR CONTROLLING GEAR CHANGES

The present invention relates to the field of hybrid transmissions for motor vehicles, comprising firstly an internal combustion engine for drive and secondly an electric machine.

More precisely, its object is a hybrid transmission for a motor vehicle provided with an internal combustion engine and an electric machine for drive, comprising two concentric primary shafts connected to the crankshaft of the internal combustion engine and to the electric machine without a disconnect clutch, a secondary shaft connected to the vehicle's wheels by a differential, and a shaft for transferring motion from a primary shaft to the secondary shaft.

Another object of the invention is a method for controlling gear changes on such a transmission using a three-position coupling device on a primary shaft, a three-position coupling device on the secondary shaft, and a three-position coupling device on the transfer shaft.

The main benefit of hybrid transmissions is that the kinematic drive train of a vehicle can benefit from two energy sources, an internal combustion engine and an electric motor, the torque output from which can be cumulated in a so-called hybrid mode or used separately, either in a "purely combustion engine" mode in which the electric machine does not supply torque to the power train, or in a "purely electric" mode in which the internal combustion engine does not supply torque to the power train. Other functionalities are also required, such as the possibility of starting the internal combustion engine when stationary or when rolling by using the electric machine as a starter, or using the electric machine as a current generator to charge the batteries.

Publication WO 2013/060955 discloses a hybrid transmission offering all of these functions thanks to an architecture comprising two concentric primary shafts connected to the internal combustion engine and the electric machine respectively, a first secondary shaft connected to the vehicle's wheels, and a second secondary shaft delivering the motion from a primary shaft to the differential. The primary shafts are coupled via an element which can occupy three positions in which:

the internal combustion engine is decoupled from the drive train connecting the electric machine to the wheels, or is coupled thereto via the second secondary shaft, the primary shaft connected to the internal combustion engine is coupled to the first secondary shaft or to the primary shaft connected to the electric machine, and the primary shaft connected to the internal combustion engine is coupled to the primary shaft connected to the electric machine so as to cumulate their torque output.

This transmission has four combustion engine or hybrid gears and two electric gears. It has certain drawbacks linked primarily to its dimensions. The total length of the transmission is imposed by the alignment of four gearwheels, two claw clutch groups and an input pinion. This stack is too long for some small vehicles. Its transverse dimension or "mask", viewed from the crankshaft axis, imposes too great a front overhang for many applications.

Also, two of the four engine gears (2nd and 4th gears) are independent of the electric gears, but the selection of one of the gears (3rd gear) is necessarily associated with the selection of an electric gear.

The present invention proposes to provide a hybrid transmission which is more compact than its predecessor in both dimensions, while having a greater flexibility in the use of the internal combustion engine and the electric machine thanks to the independence of their reduction gears.

To this end, the invention provides that the electric machine is arranged at the opposite end of the primary line relative to the internal combustion engine.

Preferably, the transmission has only a single differential input pinion carried by the secondary shaft to ensure the transfer of motion to the differential in the direction of the vehicle's wheels.

In a particular embodiment, the transmission comprises a second electric machine coupled to the transfer shaft.

The three coupling devices of the transmission may be controlled by a three-position electric gear shift group and a five-position combustion engine gear shift functional group.

Further characteristics and advantages of the invention will appear clearly from reading the description below of a non-limitative embodiment thereof, with reference to the attached drawings on which:

FIGS. 5 to 7 illustrate three examples of acceleration sequences,

Figure 2:
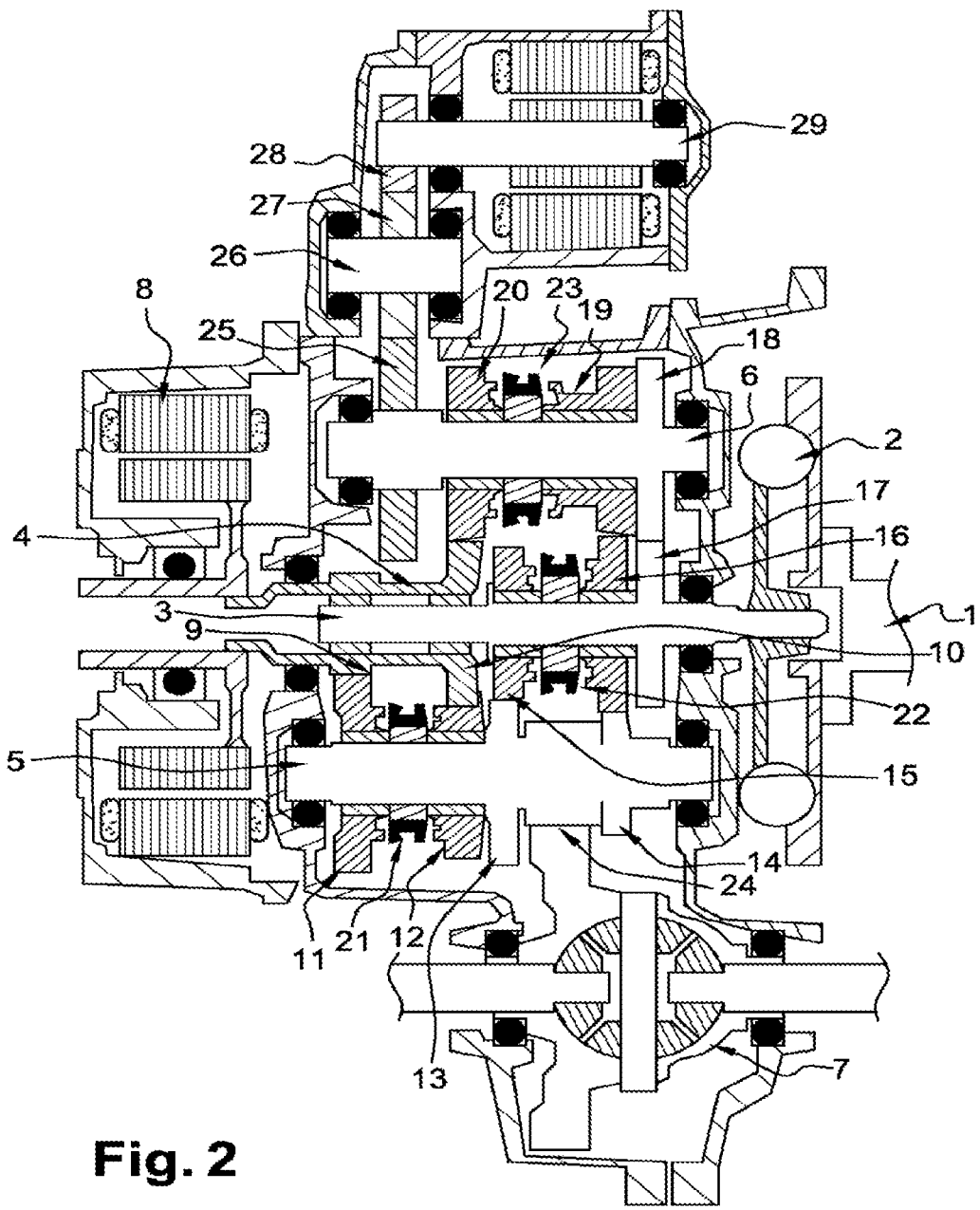
FIG. 2 shows a second embodiment of the invention.
Figure 9:
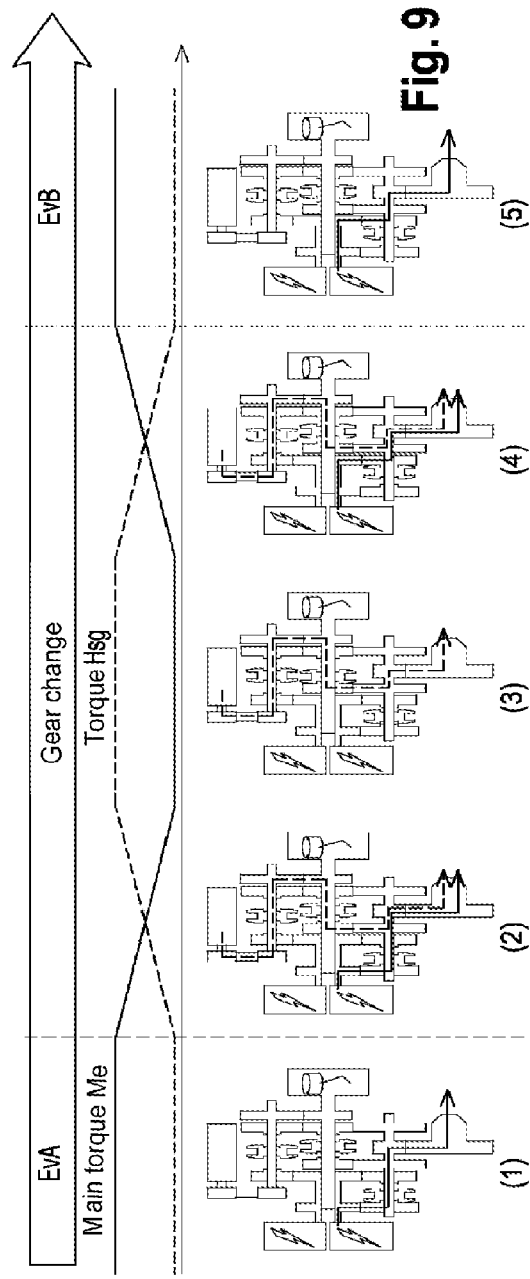
Figure 10:
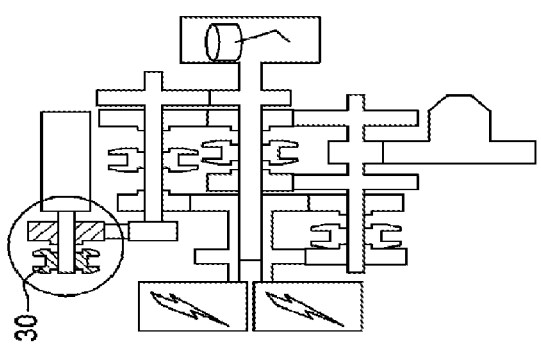
Figure 11B:
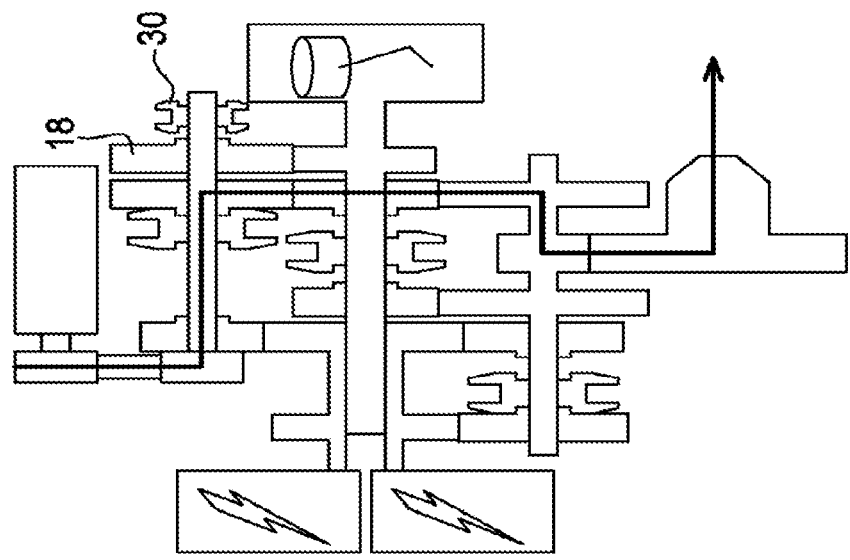
Figure 11A:
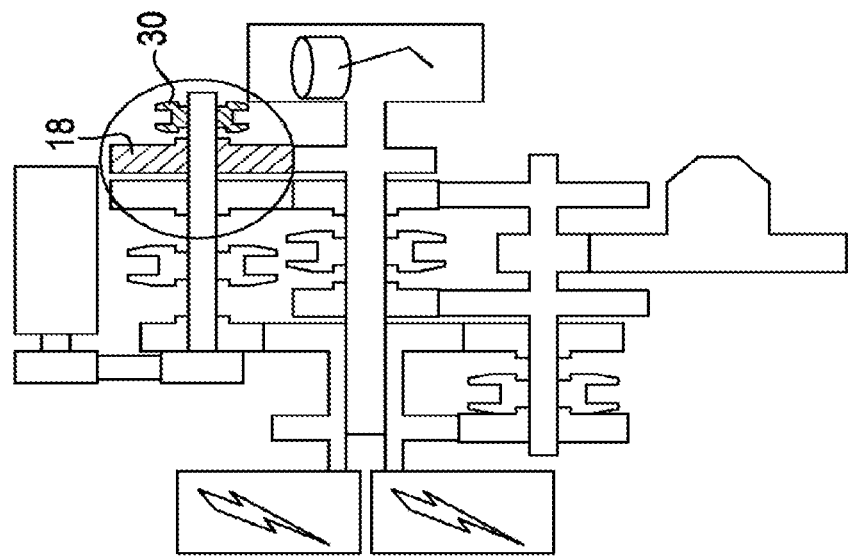
Figure 15A:
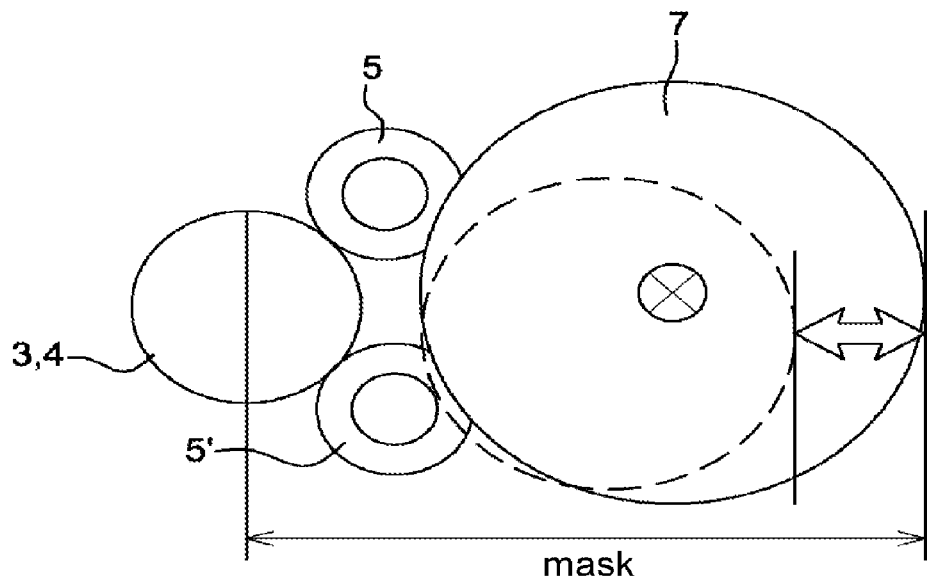
Figure 15B:
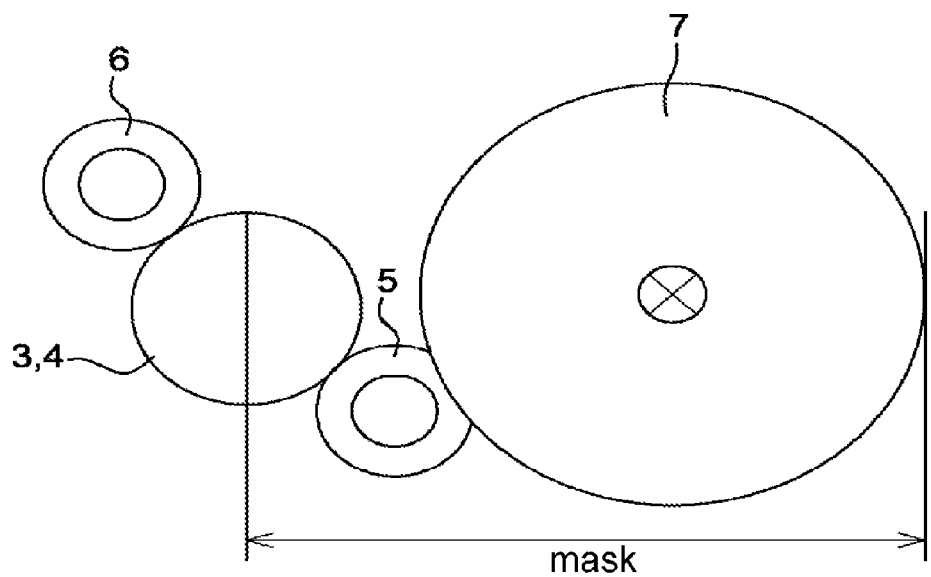

FIGS. 8A and 8B illustrate a standard hybrid function mode with the two electric machines, FIG. 9 illustrates a change of electric gear under torque with the two electric machines, FIGS. 10, 11A and 11B illustrate the disconnection of the second electric machine, FIGS. 12 and 13 show two possibilities for installation of the parking function, FIG. 14 is an alternative to FIG. 2 with the transmission driven by the second electric machine, and FIGS. 15A and 15B show the reduction in the mask of the transmission obtained by the invention.

Figure 1:
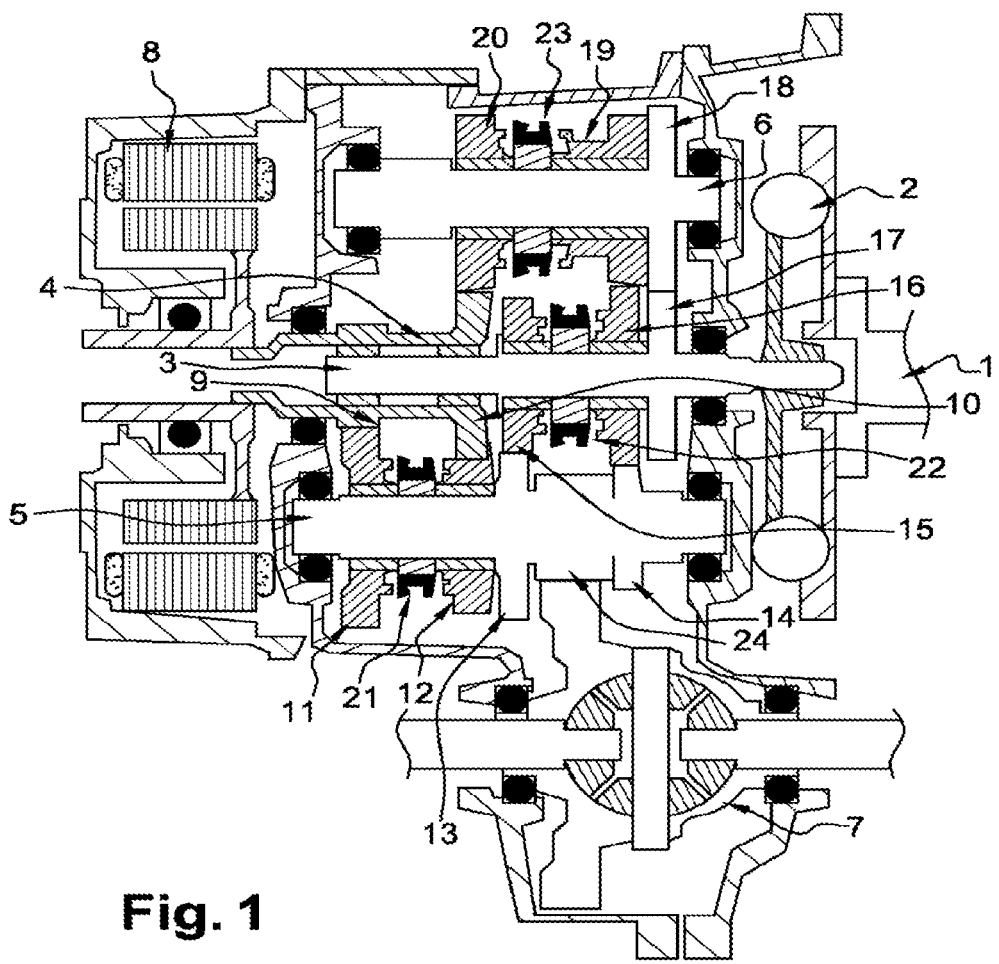
FIG. 1 shows a first embodiment of the invention.

The hybrid transmission in FIG. 1 for a motor vehicle, provided with an internal combustion engine and an electric machine 8 for drive, comprises two concentric primary shafts 3, 4 connected to the crankshaft 1 of the internal combustion engine Ice (not shown) and to the electric machine 8 without a disconnect clutch. It comprises a secondary shaft 5 connected to the vehicle's wheels by a differential 7, and a shaft 6 for transferring the motion of a primary shaft 3 to the secondary shaft 5 and for coupling the primary shafts. The solid primary shaft 3 is connected directly via a filtration system 2 (damper hub, dual mass flywheel or similar), to the lug of the crankshaft 1 of the internal combustion engine (Ice). The hollow primary shaft 4 is connected to the electric machine 8 arranged at the opposite end of the primary line 3, 4 relative to the internal combustion engine. The secondary shaft 5 carries an input pinion 24 of the differential 7. The transfer shaft 6 is permanently connected to the solid primary shaft 3. It delivers the motion from the primary shaft to the secondary shaft in certain transmission gears, but does not give a direct input into the differential. The transmission has only a single differential input pinion 24 carried by the secondary shaft 5 to ensure the transfer of motion in the direction of the vehicle's wheels. The hollow primary shaft 4 carries two fixed electric pinions 9, of the electric gears A and B, engaging with two electric idler pinions 11, 12 of the secondary shaft 5. The latter also carries two fixed gearwheels 13, 14 of the combustion engine (or hybrid) gears Ic2, and Ic3 or Ic4, Ic2 EvA, and Ic3 EvA or Ic4 EvA, Ic2 EvB, and Ic3 EvB or Ic4 EvB. The idler pinions 15, 16 of 2nd and 4th gears are carried by the solid primary shaft 3, which also carries a fixed primary coupling pinion 17 engaging with a fixed coupling pinion 18 of the transfer shaft 6. The idler pinion 19 of 3rd gear is carried by the transfer shaft 6, together with the idler coupling pinion 20 of the primary shafts in 1st gear.

The transmission comprises three coupling devices 21, 22, 23. The first coupling device 21 or electric coupling device is carried by the secondary shaft 5. It allows engagement of two electric gears A, B. The second coupling device 22 is carried by the solid primary shaft 3. It allows engagement of the 2nd and 4th combustion engine gears. 3rd gear and the coupling of the primary shafts (1st and 5th gears and battery charging) are ensured by the third coupling device 23 carried by the transfer shaft 6.

In the embodiment illustrated on FIG. 2, the same elements are found in the same arrangement. The transmission furthermore comprises a second electric machine 29 coupled to the transfer shaft 6 by an input pinion 28, which via a pinion 26 fixed to a lay shaft drives a fixed input pinion 25 of the second electric machine 29 on the transfer shaft. An additional coupling device 30, not shown on FIG. 2 but present on FIGS. 10, 11A, 11B, may be added if required. It allows the second electric machine 29 to be connected to or disconnected from the transmission.

In the two modes described, the transmission has a triple gearing 16, 19, 14 between an idler pinion 19 of the transfer shaft 6, an idler pinion 16 of a primary shaft 3, and a fixed gearwheel 14 of the secondary shaft 5.

The coupling means 21, 22, 23 may be of any type: claw coupling, synchronizer, wet clutch or other. The electric machine may also be of any type: magnet machine, asynchronous machine, reluctance machine, in any type of radial arrangement (inner or outer rotor) or axial arrangement, cooled by water, air or oil. The damper flywheel 2 may also be of any type, and the filtration used may have large curved springs, a single slope or two slopes. Like the first, the second electric machine 29 may be of any type. It may be mounted on the transmission in an "add-on" arrangement, wherein the machine and its transmission in this case constitute an assembly offset to the transmission casing, or it may be integrated in the interior thereof in an "add-in" arrangement.

In both modes described:
the first primary shaft 3 carries a fixed gearwheel 17 allowing permanent transfer of motion to the transfer shaft 6, and two idler pinions 15, 16 of the combustion engine or hybrid gears, engaging with the fixed gearwheels 13, 14 of the secondary shaft 5,
the second primary shaft 3 carries two fixed gearwheels 9, 10 of the electric gears A, B, engaging with two idler pinions 11, 12 of the secondary shaft 5,
the secondary shaft 5 carries the two idler pinions 11 and 12 of the electric gears A and B, two fixed pinions 13, 14 of 2nd, 3rd and 4th gears, and the differential input pinion 24,
the transfer shaft 6 carries a fixed gearwheel 18 engaging with a fixed gearwheel 17 of the first primary shaft 3, and two idler pinions 19, 20 engaging respectively with an idler pinion 16 of the first primary shaft 3 and a fixed gearwheel 10 on the second primary shaft 4.

Figure 3:
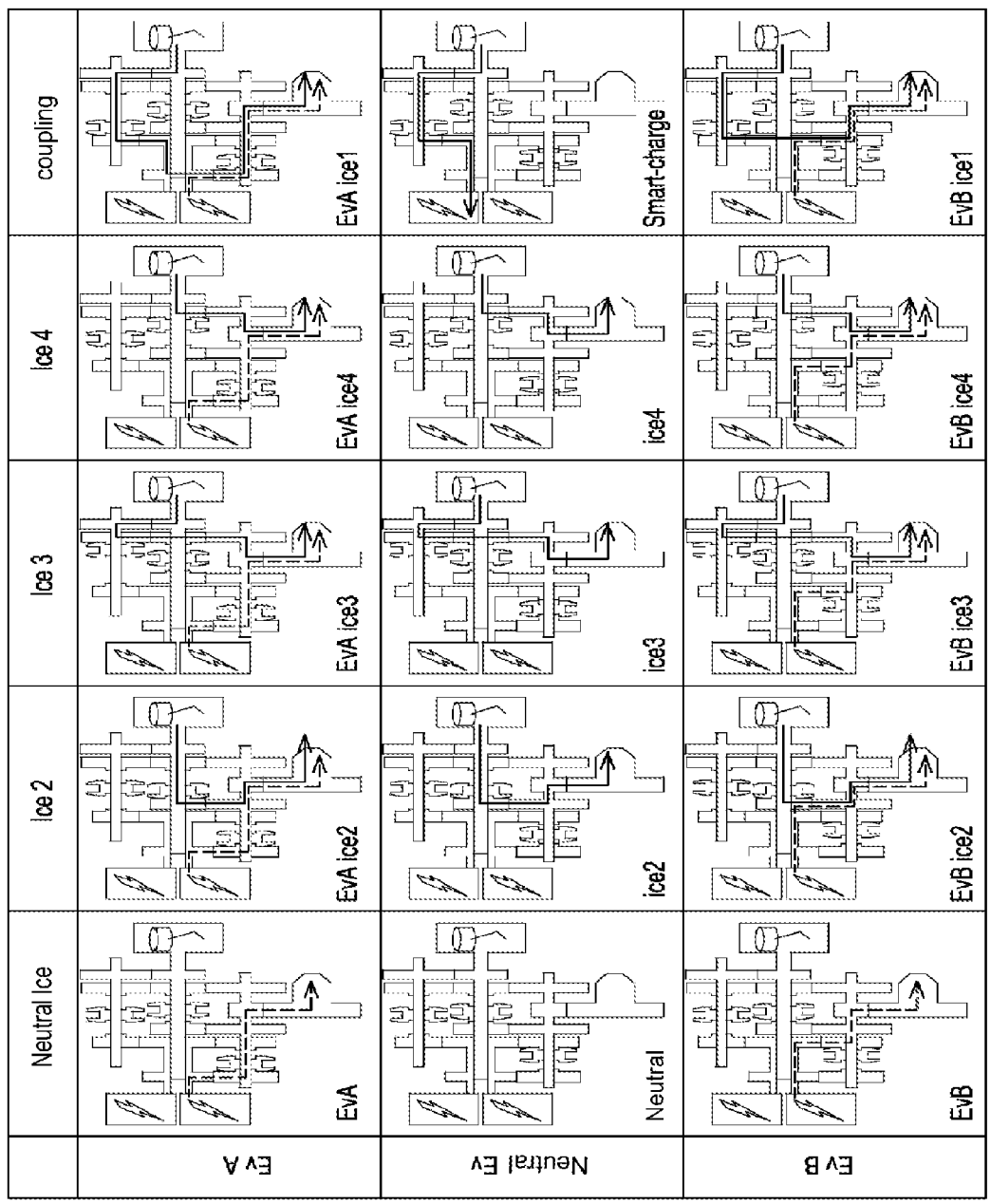
FIG. 3 is a function table corresponding to the first embodiment.

Each of the three coupling devices has three positions, different combinations of which are shown on FIG. 3:

Neutral Ice for decoupling of the internal combustion engine with the electric machine stopped (Neutral Ev) or supplying a torque to the wheels via electric gears A or B (EvA or EvB),
Ice2, Ice EvA, Ice2 EvB for 2nd combustion engine gear alone, or with an electric torque supplied via gear A or B,
Ice3, Ice3 EvA, Ice3 EvB for 3rd combustion engine gear alone, or with an electric torque supplied via gear A or B,
Ice4, Ice4 EvA, Ice4 EvB for 4th combustion engine gear alone, or with an electric torque supplied via gear A or B,
EvA Ice1, Smart-charge, EvB Ice5, for coupling of the primary shafts by the transfer shaft to 1st combustion engine gear, in recharge mode, to a 5th combustion engine gear.

The three positions of the coupling device 22 of the solid primary shaft 3 are as follows:
a position in which the primary shaft 3 connected to the internal combustion engine is decoupled from the drive train connecting the electric machine 8 to the wheels (Neutral Ice and Ic3), or coupled thereto via the transfer shaft 6 (coupling), or coupled to the electric machine 8 (coupling column), and
two positions in which the primary shaft 3 connected to the internal combustion engine is coupled directly to the secondary shaft 5 (Ice2 and Ice4).

The coupling device 21 of the secondary shaft may occupy:
a position in which the primary shaft 4 connected to the electric machine 8 is decoupled from the secondary shaft 5 (Neutral Ev), and
two positions in which the primary shaft 4 connected to the electric machine 7 is coupled directly to the secondary shaft 5 (EvA and EvB).

The coupling device 21 of the transfer shaft may occupy three positions in which:
the transfer shaft 6 is decoupled from the secondary shaft 5 (Neutral Ice, Ic2, Ic4),
the transfer shaft ensures the transfer of motion from the internal combustion engine to the secondary shaft 5 (Ice3), and
the transfer shaft couples the two primary shafts 3, 4 (coupling).

Figure 4:
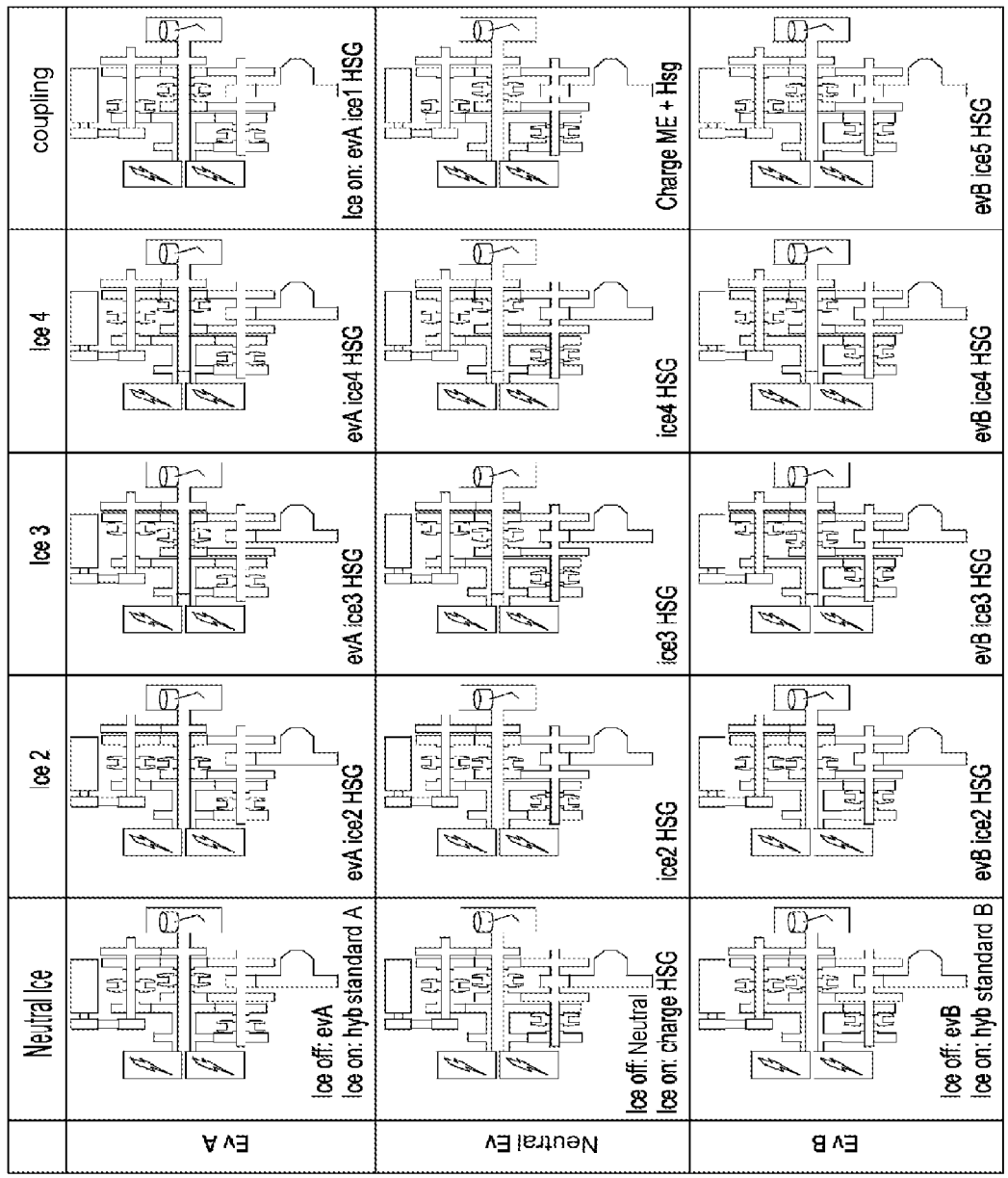
FIG. 4 is a function table corresponding to the second embodiment.

FIG. 4, corresponding to the second embodiment, reads as FIG. 3 but with the addition of the second electric machine, designated HSG for "high voltage start generator". The three combustion engine gears Ice2, Ice3, Ice4 are accessible in a parallel hybrid function mode, with the second electric machine 29 alone or with both electric machines 8, 29 coupled to one of the two electric gears A, B.

According to FIGS. 3 and 4, the function of the transmission may be limited to five of the 3×3 combinations of positions of the coupling devices 22, 23 of the primary shaft and of the transfer shaft. The combinations selected are used respectively for gears Ice2 and Ice4 and for gear Ice3 and coupling. To avoid blocking the transmission due to the unintentional engagement of two combustion engine gears, these two devices may be controlled by a conventional selection/shift system of a manual gearbox, where a shift line is selected before a gear thereon is engaged: to engage all gears illustrated by the 15-position table in FIG. 3, and operate all gear changes necessary for the good function of the transmission, the three coupling devices 22, 21, 23 are advantageously controlled by a three-position electric gear shift group and a five-position combustion engine gear shift functional group.

FIG. 5 illustrates an acceleration sequence minimizing electric driving, suitable in particular for a "midweek" usage mode, with the possibility of recharging the batteries between several journeys. The vehicle starts in electric gear EvA. The shift to electric gear EvB, which takes place for example around km/h, is achieved with torque interruption in the following sequence: disconnection of the electrical torque, disengagement of the idler pinion 11 of EvA, synchronization of the electric machine under no load so that the idler pinion 12 of EvB reaches the speed of the secondary shaft 5, then engagement of gear B and reconnection of torque. Then gear EvB Ic4 may be selected: traction is maintained by the electric motor on gear EvB, the internal combustion engine is started (using its specific starter device) then synchronized under no load up to the speed of the idler pinion 14 of gear Ic4, the internal combustion engine Ice is engaged, then the torque level is adjusted between this and the electric machine 8. To optimize fuel consumption and avoid loss of drive of the electric machine, the electric machine may be disconnected and stopped. It may however be reconnected for regeneration or for torque addition (boost) on acceleration.

FIG. 6 is a sequence with electric driving but without loss of torque, in a usage mode known as "midweek comfort mode". The vehicle is started in electric gear EvA up to for example around 70 km/h. The internal combustion engine is started, then run at no load until reaching the speed of idler pinion 19 of gear Ic3. The internal combustion engine is engaged, then the torque level is adjusted between this and the electric machine 8. Then a shift takes place from gear EvA Ic3 to gear EvB Ic3, for example around 80 km/h, by disconnecting the electric motor torque before disengaging the pinion 11, synchronizing the electric machine under no load so that it reaches the speed of gear EvB, and engaging the pinion 12. Above 100 km/h, a shift can be made from EvB Ic3 to EvB Ic4 while maintaining the electric traction in gear EvB. The torque from the internal combustion engine is disconnected, then transferred to EvB; the internal combustion engine is braked and decelerates (with or without additional friction devices). When the speed of idler pinion 12 of Ice4 is reached, the internal combustion engine Ice is engaged. The torque is again distributed between the internal combustion engine and the electric machine 8.

FIG. 7 gives an example of a sequence for a strong acceleration request, where applicable with the support of the second electric machine 29. The vehicle is still started in the electric gear EvA. At around 25 km/h, the internal combustion engine is started in gear Ice2. Around 82 km/h, the electric machine can switch from gear EvA to gear EvB, and then shift to gear EvB Ic3 at around 100 km/h. In this sequence of the "kick down" type, the torques from the electric machine and the internal combustion engine do not pass through the same pinion of the primary line. It is possible to transmit the entire torque of the electric machine and the internal combustion engine to the wheels without limitation.

The presence of a second electric machine allows a large number of functionalities to be added to the transmission. The starting of the internal combustion engine can be quieter and quicker without starter noise. Rapidity of starting is essential for driving pleasure, in particular for provision of additional power on overtaking. This rapidity also allows its disconnection as soon as it is no longer useful for traction. Then savings can be made in fuel consumption, in particular by eliminating the engine braking on deceleration, maximizing the regenerative power of the electric machine. Also, it is possible to maintain low loads with the electric machine alone, without engine braking, in so-called "sailing" mode.

The second electric machine 29 also allows an improvement in gear changes thanks to the electric synchronization thereof, called "e-synchronization". Just as the torque control of an electric machine is faster and more precise than that of an internal combustion engine, the addition of a second electric machine with direct output allows finer control of the internal combustion engine under no load during gear shifts. In concrete terms, the shift time and the engagement shocks are reduced. In particular, it is possible to recover the kinetic energy stored by the inertia of flywheel of the internal combustion engine on shifts from a short gear to a longer gear, where the internal combustion engine must be slowed down.

As indicated above, with its two electric machines, the transmission has standard hybrid modes. These are particularly well adapted, in terms of fuel consumption and driving pleasure, to low loads and low speeds, for example in urban use or in congestion. These modes are also useful for heating the catalytic converter to an optimum charge level independently of traction. Thus emissions can be reduced while storing the energy produced in the battery.

Finally, the addition of the second electric machine 29 allows changes of electric gears (from EvA to EvB and vice versa) under torque without starting the internal combustion engine (without combustion, i.e. in electric mode) but by driving it under no load. The changes of electric gears A, B and B, A take place under torque, causing the internal combustion engine to rotate without injecting fuel. This sequence in FIG. 9 from the first gear A, produced by the first electric machine 8 (step 1), is as follows:

a) synchronization of the second electric machine 29 to the speed of the idler pinion 12 of the second electric gear EvB via the internal combustion engine without fuel injection, and engagement of the second electric machine 29 (step 2), b) supply of torque by the second electric machine 29 and disengagement of gear EvA (step 3), c) synchronization of the first electric machine 8 and supply of torque by this to the second gear EvB (step 4), d) disconnection of the second electric machine 29.

The torque is transferred temporarily from one machine to the other between steps 2 and 4. The compensation power level of the second electric machine is deducted from the drag of the internal combustion engine when driven under no load. Shifting from EvA to EvB in either kick-down mode or with foot off takes place under torque under the same conditions, wherein the engine braking is maintained in the latter case.

FIG. 10 illustrates a refinement of the second embodiment described, allowing decoupling of the second electric machine 29 from the internal combustion engine Ice. The additional coupling device 30 carried by the spindle of the second electric machine 29 eliminates the mechanical or electromagnetic drive losses therein. This arrangement allows a reduction in fuel consumption. Its benefit is felt in prolonged driving on motorways. The device 30 may be of any type, for example a claw clutch actuated by an electromagnet, integrated or not in the machine 30.

FIGS. 11A and 11B illustrate another refinement of the second embodiment, also allowing decoupling of the second electric machine from the internal combustion engine. The additional coupling device 30 is placed at the end of the transfer shaft 6, outside its fixed coupling pinion 18. Drive losses are eliminated in the second machine 29 and on the transfer shaft 6 (in particular on motorways) to reduce fuel consumption, or to cumulate its power with that of the first electric machine in electric gears EvA or EvB. The second machine 29 may also act to increase the electrical compensation level on shifts under torque between the two electric gears EvA and EvB.

As indicated on FIG. 12, the coupling device of the primary shafts 23 may comprise a fixed claw ring 32 around the transfer shaft 6 for implementing the parking function. The claw ring 32 cooperates with its coupling device 23 to perform the function of a parking brake. The five positions of the shift/selection function associated with the internal combustion engine then become Neutral, Park, 1st, 2nd, 3rd.

FIG. 13 shows an original installation of the parking gear on the transmission. The proximity of the transfer shaft makes it difficult to install the parking function on the secondary shaft as usual, so the parking gear 33 is placed on the 3rd gear idler pinion 19 of the transfer shaft 6 which is directly linked to the wheels, while being sufficiently accessible for installation of a parking gear actuator.

Finally, FIG. 14 shows yet another variant of the second embodiment, in which the second electric machine 29 drives the coupling pinion 18 of the transfer shaft 6.

There are many advantages and possibilities of use of the hybrid transmission proposed by the invention. Its length is reduced relative to that of known hybrid transmissions. This length is determined by the alignment of only five gearwheels and two clutch groups, allowing a reduction of around 15 mm thanks to the omission of a differential input pinion on the secondary line.

As indicated above, the presence of a single input pinion allows a reduction in the mask of the transmission, which can therefore be integrated more easily in small vehicles. FIGS. 15A and 15B illustrate the reduction in the mask relative to a known hybrid transmission (FIG. 15A) comprising two secondary shafts 5, 5' which both give an input into the differential 7. With two secondary shafts and two input pinions (FIG. 15A), the position of the latter is determined by the relative proximity of the two secondary shafts. This requires the use of a large ring in order to be able to engage with both input pinions at the same time and achieve a short reduction. These constraints impose problems of installation of the transmission in the engine bay, for the safety of occupants in the case of a crash, and positioning of the steering ring, in particular on small vehicles. According to the invention (FIG. 15B), the transmission has only a single secondary shaft 5 and the motion passing through the transfer shaft 6 is transmitted to the differential via the single secondary shaft 5. This architecture allows the use of a smaller differential ring. Its mask is reduced. It is therefore integrated much more easily in small vehicles.

Finally, the independence of gear changes in electric mode and in internal combustion engine mode gives a great flexibility in the use of electric and combustion engine gears, while retaining the best compromise between the driver's torque demand, acoustics and the vehicle's fuel consumption.

The invention claimed is:

1. A hybrid transmission for a motor vehicle including an internal combustion engine and an electric machine, the hybrid transmission comprising:
   two concentric primary shafts including a solid primary shaft and a hollow primary shaft, and connected to a crankshaft of the internal combustion engine and to the electric machine without a disconnect clutch, the solid primary shaft including two idler pinions of a hybrid or combustion engine gears;
   a secondary shaft connected to wheels of the vehicle by a differential, the two idler pinions being configured to engage with fixed gearwheels of the secondary shaft; and
   a transfer shaft configured to transfer motion from at least one of the primary shafts to the secondary shaft and couple the primary shafts,
   wherein the electric machine is located at an opposite end of the primary shafts relative to the internal combustion engine.

2. The hybrid transmission as claimed in claim 1, wherein the secondary shaft includes a single differential input pinion configured to transfer a motion to the differential in a direction of the wheels of the vehicle.

3. The hybrid transmission as claimed in claim 2, wherein the solid primary shaft further includes a fixed gearwheel for a permanent transfer of the motion to the transfer shaft.

4. The hybrid transmission as claimed in claim 2, wherein the hollow primary shaft includes two fixed gearwheels of the electric motor gears, to engage with two idler pinions of the secondary shaft.

5. The hybrid transmission as claimed in claim 4, wherein the transfer shaft includes a fixed gearwheel engaged with a fixed gearwheel of the solid primary shaft, and two idler pinions engaging respectively with the idler pinion of the solid primary shaft and the fixed gearwheel of the second primary shaft.

6. The hybrid transmission as claimed in claim 1, a triple gearing between an idler pinion of the transfer shaft, the idler pinion of the solid primary shaft, and the fixed gearwheel of the secondary shaft.

7. The hybrid transmission as claimed in claim 3, wherein the solid primary shaft includes a first coupling device configured to
   decouple the primary shaft connected to the internal combustion engine from a drive train connecting the electric machine to the wheels, or coupled thereto by the transfer shaft, or coupled to the electric machine, and
   couple the primary shaft connected to the internal combustion engine directly to the secondary shaft.

8. The hybrid transmission as claimed in claim 4, wherein the secondary shaft includes a second coupling device configured to
   decouple the primary shaft connected to the electric machine from the secondary shaft, and
   couple the primary shaft connected to the electric machine directly to the secondary shaft.

9. The hybrid transmission as claimed in claim 4, wherein the transfer shaft includes a third coupling device configured to
   decouple the transfer shaft from the secondary shaft,
   transfer a motion from the internal combustion engine to the secondary shaft, and
   couple the solid primary shaft and the hollow primary shaft.

10. A hybrid transmission for a motor vehicle including an internal combustion engine and an electric machine, the hybrid transmission comprising:
    two concentric primary shafts including a solid primary shaft and a hollow primary shaft, and connected to a crankshaft of the internal combustion engine and to the electric machine without a disconnect clutch, the solid primary shaft including two idler pinions of a hybrid or combustion engine gears;

a secondary shaft connected to wheels of the vehicle by a differential, the two idler pinions being configured to engage with fixed gearwheels of the secondary shaft;

a transfer shaft configured to transfer motion from at least one of the solid primary shafts to the secondary shaft and couple the primary shafts; and a second electric machine coupled to the transfer shaft, wherein the electric machine is located at an opposite end of the primary shafts relative to the internal combustion engine.

11. The hybrid transmission as claimed in claim 10, further comprising an additional coupling device configured to connect or disconnect the second electric machine from the hybrid transmission.

12. The hybrid transmission as claimed in claim 10, wherein the second electric machine is coupled to the transfer shaft by an input pinion and drives a fixed input pinion on the transfer shaft by a pinion fixed to a lay shaft.

13. The hybrid transmission as claimed in claim 11, wherein a spindle of the second electric machine includes the additional coupling device.

14. The hybrid transmission as claimed in claim 11, wherein the additional coupling device is placed at the end of the transfer shaft.

15. The hybrid transmission as claimed in claim 10, wherein the transfer shaft includes a fixed claw ring around the transfer shaft, the fixed claw ring being a parking brake by cooperating with a coupling device of the transfer shaft.

16. The hybrid transmission as claimed in claim 1, further comprising a parking gear mounted on a third gear idler pinion of the transfer shaft.

17. The hybrid transmission as claimed in claim 10, further comprising a parking gear mounted on a third gear idler pinion of the transfer shaft.

18. The hybrid transmission as claimed in claim 10, wherein the second electric machine drives a coupling pinion of the transfer shaft.

19. A method for controlling gear changes on a hybrid transmission for a motor vehicle including an internal combustion engine, a first electric machine using three-position coupling devices, two concentric primary shafts including a solid primary shaft and a hollow primary shaft and connected to a crankshaft of the internal combustion engine and to the first electric machine without a disconnect clutch, a secondary shaft connected to wheels of the vehicle by a differential, and a transfer shaft configured to transfer motion from at least one of the solid primary shafts to the secondary shaft and couple the primary shafts, the first electric machine being located at an opposite end of the primary shafts relative to the internal combustion engine, and the three-position coupling device including a three-position coupling device of the solid primary shaft, a three-position coupling device of the secondary shaft, and a three-position coupling device of the transfer shaft, the method comprising:

controlling the three-position coupling devices by a three-position electric gear shift group and by a five-position combustion engine gear shift functional group.

20. The method for controlling gear changes as claimed in claim 19, wherein three combustion engine gears are accessible in a parallel hybrid function mode, with a second electric machine only, or with both the first electric machine and the second electric machine, coupled to one of the two electric gears of the transmission.

21. The method for controlling gear changes as claimed in claim 20, further comprising changing of the electric gears based on a torque by causing the internal combustion engine to rotate without injecting fuel therein.

22. The method for controlling gear changes as claimed in claim 21, wherein the changing of the electric gears includes synchronizing the second electric machine to a speed of an idler pinion of the second electric gear, via the internal combustion engine without injection of fuel, and engaging the second electric machine, supplying the torque by the second electric machine and disengaging the first electric gear, synchronizing a first electric machine and supplying the torque to a second gear, and disconnecting the second electric machine.

* * * * *